US012777072B2

(12) United States Patent
Liu

(10) Patent No.: US 12,777,072 B2
(45) Date of Patent: Oct. 27, 2026

(54) FEDERATED LEARNING METHODS AND APPARATUSES, READABLE STORAGE MEDIA, AND ELECTRONIC DEVICES

(71) Applicant: Alipay (Hangzhou) Information Technology Co., Ltd., Hangzhou (CN)

(72) Inventor: Yan Liu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 124 days.

(21) Appl. No.: 18/970,060

(22) Filed: Dec. 5, 2024

(65) Prior Publication Data

US 2025/0097265 A1 Mar. 20, 2025

Related U.S. Application Data

(63) Continuation of application No. PCT/CN2023/114304, filed on Aug. 22, 2023.

(30) Foreign Application Priority Data

Dec. 26, 2022 (CN) ........................ 202211676596.8

(51) Int. Cl.
*H04L 9/40* (2022.01)
*G06N 20/00* (2019.01)

(52) U.S. Cl.
CPC ........... *H04L 63/166* (2013.01); *G06N 20/00* (2019.01); *H04L 9/40* (2022.05)

(58) Field of Classification Search
CPC ......... H04L 63/166; H04L 9/40; G06N 20/00; G06F 21/6245; G06F 21/57
See application file for complete search history.

(56) References Cited

U.S. PATENT DOCUMENTS

2022/0318412 A1 10/2022 Guo et al.
2023/0039182 A1* 2/2023 Cheng ................. G06F 21/6245
2024/0333604 A1* 10/2024 Zhu ......................... H04W 8/22

FOREIGN PATENT DOCUMENTS

CN 110601814 A 12/2019
CN 110995737 A 4/2020
(Continued)

OTHER PUBLICATIONS

Gao, et al., "FIFL: A Fair Incentive Mechanism for Federated Learning"; Oct. 5, 2021, ICPP 21: Proceedings of the 50th International Conference on Parallel Processing, Article No. 82.*
(Continued)

*Primary Examiner* — J. Brant Murphy
(74) *Attorney, Agent, or Firm* — Fish & Richardson P.C.

(57) ABSTRACT

This application relates to methods, readable storage media and apparatuses for federated learning. In an example, a first aspect program is injected at a gradient sending function of a federated learning device by using a pre-deployed aspect framework. A to-be-trained model is trained based on local training data to obtain a plaintext gradient of the to-be-trained model. The plaintext gradient is sent to a federated learning server by using the gradient sending function. The plaintext gradient is intercepted and encrypted by using the first aspect program to obtain a ciphertext gradient. The ciphertext gradient is sent to the federated learning server by using the first aspect program, so that the federated learning server decrypts received ciphertext gradients sent by federated learning devices, and updates parameters of the to-be-trained model based on the plaintext gradients obtained after the decryption.

12 Claims, 3 Drawing Sheets

(56) References Cited

FOREIGN PATENT DOCUMENTS

| | | | |
|---|---|---|---|
| CN | 112199702 | A | 1/2021 |
| CN | 113094758 | B | 8/2021 |
| CN | 113392428 | A | 9/2021 |
| CN | 113434873 | A | 9/2021 |
| CN | 113824677 | A | 12/2021 |
| CN | 114172719 | A | 3/2022 |
| CN | 114239026 | A | 3/2022 |
| CN | 110995737 | B | 8/2022 |
| CN | 115185534 | A | 10/2022 |
| CN | 115185605 | A | 10/2022 |

OTHER PUBLICATIONS

International Preliminary Report on Patentability in International Appln. No. PCT/CN2023/114304, mailed on Jul. 10, 2025, 13 pages (with English translation).

International Search Report and Written Opinion in International Appln. No. PCT/CN2023/114304, mailed on Nov. 21, 2023, 11 pages (with partial English translation).

Extended European Search Report in European Appln. No. 23909213.3, mailed on Oct. 7, 2025, 6 pages.

Zhang et al., "Citadel: Protecting Data Privacy and Model Confidentiality for Collaborative Learning," Paper, Presented at the SoCC '21: ACM Symposium on Cloud Computing, Seattle, WA, USA, Nov. 1-4, 2021; SoCC '21: Proceedings of the ACM Symposium on Cloud Computing, ACM, Nov. 1, 2021, pp. 546-561.

* cited by examiner

FEDERATED LEARNING METHODS AND APPARATUSES, READABLE STORAGE MEDIA, AND ELECTRONIC DEVICES

CROSS-REFERENCE TO RELATED APPLICATIONS

This application is a continuation of PCT Application No. PCT/CN2023/114304, filed on Aug. 22, 2023, which claims priority to Chinese Patent Application No. 202211676596.8, filed on Dec. 26, 2022, and each application is hereby incorporated by reference in its entirety.

TECHNICAL FIELD

This application relates to the field of machine learning algorithms, and more specifically, to federated learning methods and apparatuses, readable storage media, and electronic devices.

BACKGROUND

Gradient exchange is a common communication method for modern multinode training (e.g., distributed training and federated learning). To be specific, devices obtain gradients for a to-be-trained model based on local training data and share respective gradients. Then, the gradients are aggregated and the to-be-trained model is updated by using a resulting aggregated gradient. However, in a gradient sharing process, an attacker may acquire plaintext gradient information by way of network traffic monitoring or encrypted traffic interception, etc., and then acquire private training data of corresponding devices based on the gradient information, causing privacy leakage.

SUMMARY

One of the objectives of this application is to provide federated learning methods. Based on a security aspect, when federated learning devices send plaintext gradients to a federated learning server, the plaintext gradients are intercepted and encrypted, and encrypted ciphertext gradients are sent to the federated learning server, thereby reducing privacy leakage caused by acquisition of the plaintext gradients by an attacker.

Based on the above-mentioned objective, one aspect of this application provides a federated learning method. The method is applied to a federated learning device and includes the following steps: the federated learning device injects, based on a predetermined first join point and a first aspect program, the first aspect program at a gradient sending function of the federated learning device by using a pre-deployed aspect framework; the federated learning device trains a to-be-trained model based on local training data to obtain a plaintext gradient of the to-be-trained model, and sends the plaintext gradient to a federated learning server by using the gradient sending function; and the plaintext gradient sent by using the gradient sending function is intercepted and encrypted by using the first aspect program, to obtain a ciphertext gradient, and the ciphertext gradient is sent to the federated learning server, so that the federated learning server decrypts received ciphertext gradients sent by federated learning devices, and updates parameters of the to-be-trained model based on the plaintext gradients obtained after the decryption.

Further, in some implementations, the federated learning method further includes the following: the federated learning device performs remote authentication on a trusted execution environment of an aspect server before federated learning, and establishes a trusted transport layer security protocol connection to the trusted execution environment after the authentication succeeds; and receives an encryption key generated by using the trusted execution environment.

Further, in some implementations, the federated learning server decrypts the received ciphertext gradients sent by the federated learning devices, specifically including: the federated learning server receives the ciphertext gradients by using a gradient receiving function; and the ciphertext gradients are intercepted and decrypted by using a second aspect program pre-injected at the gradient receiving function.

Another objective of this application is to provide a federated learning method. A federated learning server receives encrypted ciphertext gradients of federated learning devices, and decrypts the ciphertext gradients to obtain decrypted plaintext gradients, thereby reducing privacy leakage caused by acquisition of the plaintext gradients by an attacker in a transmission process.

Based on the above-mentioned objective, another aspect of this application provides a federated learning method. The method is applied to a federated learning server and includes the following steps: the federated learning server injects, based on a predetermined second join point and a second aspect program, the second aspect program at a gradient receiving function of the federated learning server by using a pre-deployed aspect framework; ciphertext gradients of a to-be-trained model that are sent by federated learning devices are received by using the gradient receiving function; the ciphertext gradients are intercepted and decrypted by using the second aspect program, to obtain plaintext gradients; and parameters of the federated learning devices for the to-be-trained model are updated based on the plaintext gradients of the federated learning devices.

Further, in some implementations, the federated learning method further includes the following: remote authentication is performed on a trusted execution environment of an aspect server before federated learning, and a trusted transport layer security protocol connection is established to the trusted execution environment after the authentication succeeds; and a decryption key generated by using the trusted execution environment is received.

Still another objective of this application is to provide a federated learning apparatus. Based on a security aspect, when federated learning devices send plaintext gradients to a federated learning server, the plaintext gradients are intercepted and encrypted, and encrypted ciphertext gradients are sent to the federated learning server, thereby reducing privacy leakage caused by acquisition of the plaintext gradients by an attacker.

Based on the above-mentioned objective, still another aspect of this application provides a federated learning apparatus. The apparatus is applied to a federated learning device, and the apparatus includes the following: an injection module, configured to inject, based on a predetermined first join point and a first aspect program, the first aspect program at a gradient sending function of the federated learning device by using a pre-deployed aspect framework; a training module, configured to train a to-be-trained model based on local training data to obtain a plaintext gradient of the to-be-trained model, and send the plaintext gradient to a federated learning server by using the gradient sending function; and an encryption module, configured to intercept and encrypt, by using the first aspect program, the plaintext gradient sent by the gradient sending function, to obtain a ciphertext gradient, and send the ciphertext gradient to the federated learning server, so that the federated learning server decrypts received ciphertext gradients sent by federated learning devices, and updates parameters of the to-be-trained model based on the plaintext gradients obtained after the decryption.

Further, in some implementations, the federated learning apparatus further includes a connection module, and the connection module is configured to perform, by the federated learning device, remote authentication on a trusted execution environment of an aspect server before federated learning, and establish a trusted transport layer security protocol connection to the trusted execution environment after the authentication succeeds; and receive an encryption key generated by using the trusted execution environment.

Further, in some implementations, the federated learning server decrypts the received ciphertext gradients sent by the federated learning devices, specifically including: the federated learning server receives the ciphertext gradients by using a gradient receiving function; and the ciphertext gradients are intercepted and decrypted by using a second aspect program pre-injected at the gradient receiving function.

Still another objective of this application is to provide a federated learning apparatus. A federated learning server receives encrypted ciphertext gradients of federated learning devices, and decrypts the ciphertext gradients to obtain decrypted plaintext gradients, thereby reducing privacy leakage caused by acquisition of the plaintext gradients by an attacker in a transmission process.

Based on the above-mentioned objective, Still another aspect of this application provides a federated learning apparatus. The apparatus is applied to a federated learning server, and the apparatus includes the following: an injection module, configured to inject, based on a predetermined second join point and a second aspect program, the second aspect program at a gradient receiving function of the federated learning server by using a pre-deployed aspect framework; a receiving module, configured to receive, by using the gradient receiving function, ciphertext gradients of a to-be-trained model that are sent by federated learning devices; a decryption module, configured to intercept and decrypt the ciphertext gradients by using the second aspect program, to obtain plaintext gradients; and an update module, configured to update parameters of the federated learning devices for the to-be-trained model based on the plaintext gradients of the federated learning devices.

Further, in some implementations, the federated learning apparatus further includes a connection module, and the connection module is configured to perform remote authentication on a trusted execution environment of an aspect server before federated learning, and establish a trusted transport layer security protocol connection to the trusted execution environment after the authentication succeeds; and receive an encryption key generated by using the trusted execution environment.

Still another objective of this application is to provide a readable storage medium. A computer program is stored on the readable storage medium, and when the computer program is executed in a computer, the computer is enabled to perform the steps of the federated learning method described above.

Still another objective of this application is to provide an electronic device, including a storage and a processor. The storage stores executable code, and when executing the executable code, the processor performs the steps of the federated learning method described above.

DESCRIPTION OF EMBODIMENTS

Figure 1:
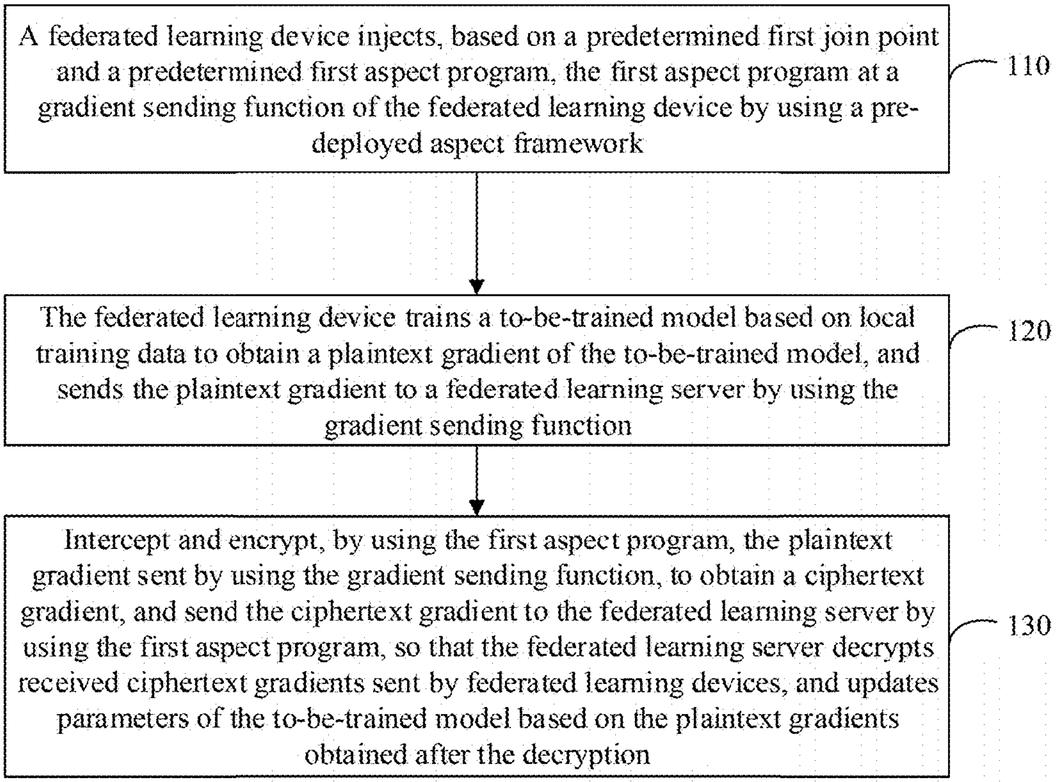
FIG. 1 is a flowchart illustrating a federated learning method, according to some embodiments of this application.

The following describes example embodiments of this application in detail with reference to accompanying drawings.

A security aspect refers to the use of Aspect-Oriented Programming (AOP) to dynamically add or modify, in running logic of a service application program, an aspect program used to implement a security aspect service, without modifying the service application program. As such, the security aspect service can be implemented, while the program for implementing the security aspect service can be decoupled from the service application program, thereby reducing a development iteration problem caused by high coupling.

The aspect program here is an enhanced program for implementing a security aspect service based on service running logic. The aspect program can be injected into a corresponding join point of a service application program by way of aspect-oriented programming, and the aspect program can be triggered for execution in a process of executing the service application program, so as to implement a security aspect service function in need.

When the service application program executes a service, the service application program usually performs service execution by using a call between methods. Therefore, any method in the service application program can be used as an entry point (namely, the join point described above) of the aspect program, and the aspect program can be injected into the corresponding join point. When the service application program proceeds to the join point, that is, a method of the service application program corresponding to the join point is called, the aspect program injected at the join point is executed.

Generally, code responsible for a process of injecting an aspect program into a join point features high reusability. Therefore, a program for implementing this process is usually abstracted as a service module, that is, an aspect framework. The aspect framework can acquire, from a server that provides a security aspect service, an aspect program that needs to be deployed and a join point for injecting the aspect program into a service application program. After an application container is started, the aspect framework can be awakened and inject the corresponding aspect program at the join point of the service application program.

The service application program can be a service application program, in a server on a service platform, that provides a service. The service can be a service provided to users by a server of a service platform, e.g., a query service and a payment service. The service can alternatively be a service provided by a certain server on a service platform to another server, e.g., a settlement service.

Certainly, it can be seen from the above description that, to decouple a program of a security aspect service from a service application program, the program of the security aspect service and the service application program can be interleaved with each other during service execution by way of aspect-oriented programming, but can be parallel with each other and individually maintained in this specification. Therefore, different from a service provider of a service application program, a third party that provides a security aspect service can manage, by using a server, content related to the security aspect service, e.g., configurations of a management and control policy for the security aspect service, version iterations of the aspect program, and deployment rules configurations of the aspect program. Certainly, a third party or a service provider can provide a security aspect service.

When managing the content related to the security aspect service, the server can record various configuration information such as configurations of various policies and deployment rule configurations of the aspect program by using a configuration file. As such, the aspect framework can complete deployment of the aspect program based on the configuration file, or the server can implement the security aspect service based on the configuration file.

In practice, a service provider generally disposes an equipment room that includes several physical machines or physical servers, to provide physical resources needed by a service application program by using the physical machines. Certainly, one service application program possibly does not need all physical resources of an entire physical machine. Therefore, generally, multiple virtual hosts (virtual hosting) are run on one physical machine by using a virtualization technology. The virtual hosts are independent of each other, and each virtual host is provided with some physical resources of the physical machine. Then, an application container can be deployed in the virtual host, and the service application program can be run by using the application container. The application container generally includes physical resources allocated to the application container, such as a CPU and a memory, as well as a running environment such as an operating system (OS) or other running environment data such as a serial number (SN) of the container, an allocated influential property (IP), an application name, a tenant, and an environment variable, that is allocated to the application container. The service application program can be deployed in an application container to execute a service.

In scenarios in which a service is executed based on a security aspect, a service provider or a server of a third party that provides a security aspect service can provide a server, manage content related to the security aspect service by using the server, deploy an aspect framework in an application container, and inject an aspect program into a service application program in a service application container by using the aspect framework, so as to provide security aspect service support for the application container of the service provider.

Therefore, the aspect framework can be deployed in the application container of the service provider in advance. Generally, when an application container is started, an operating system provided for the application container can be awakened, and a pre-deployed aspect framework can be run, so as to obtain a join point of an aspect program and a service application program from a server by using the aspect framework, and inject the aspect program into the join point of the service application program in the application container. In addition, in a process of executing the service application program, the aspect framework can also obtain the join point of the aspect program and the service application program from the server, and inject the aspect program into the join point of the service application program in the application container.

Certainly, how the aspect framework obtains, from the server, information necessary for deploying the aspect program can be set as needed. For example, the aspect framework can actively pull the necessary information from the server based on a configuration file, or the server can actively send the necessary information so the aspect framework receives the necessary information.

After the aspect program is injected into the join point of the service application program, the service application program can trigger the aspect program in an execution process, so as to implement a corresponding security aspect service function.

Federated learning is a distributed machine learning technology. A core idea of federated learning is to perform distributed model training by using multiple data sources with local data. By exchanging only model parameters or intermediate results, rather than local individual or sample data, a global model based on virtually aggregated data is constructed. This approach achieves a balance between data privacy preservation and data sharing computation, embodying a new application paradigm where “data is available but not visible” and “data stays in place while the model moves”. Participants of federated learning include one federated learning server and at least two federated learning devices. The federated learning devices have local training data. The federated learning devices can train a to-be-trained model based on the local training data to obtain respective gradients, and then send the gradients to the federated learning server. The federated learning server performs gradient aggregation based on the gradients of the federated learning devices, and then sends the aggregated gradient to each federated learning device. Each federated learning device updates parameters of the to-be-trained model based on the aggregated gradient. As such, in a training process, the training data of each device is always stored locally, and only the gradient of the to-be-trained model needs to be uploaded to the federated learning server for aggregation, and therefore private training data can be well protected.

However, in a recent study, it is found that private training data can be obtained by using a gradient of the private training data, which is referred to as deep gradient leakage. In a federated learning process, an attacker may acquire, by way of network traffic monitoring or encrypted traffic interception, etc., plaintext gradients sent by federated learning devices to a federated learning server, and then acquire training data on the federated learning devices by using the plaintext gradients, causing privacy leakage.

Therefore, this application provides a federated learning method. Based on a security aspect, when federated learning devices send plaintext gradients to a federated learning server, the plaintext gradients are intercepted and encrypted, and encrypted ciphertext gradients are sent to the federated learning server. When the federated learning server receives the ciphertext gradients, the ciphertext gradients are intercepted and decrypted to obtain the plaintext gradients, so as to perform aggregation based on the plaintext gradients of the federated learning devices and update model parameters. Such practice can effective defend against acquisition of the plaintext gradients by an attacker by way of network monitoring or man-in-the-middle attacks, thereby reducing private training data leakage. In addition, the federated learning method in this application does not need secondary development at a code level of a federated learning framework, is not intrusive to an original service, and has low maintenance costs. Moreover, the method in this application does not need model re-training, and does not affect accuracy of the model.

As shown in FIG. 1, some embodiments of this application provide a federated learning method. The method is applied to a federated learning device and includes steps 110 to 130.

110: The federated learning device injects, based on a predetermined first join point and a first aspect program, the first aspect program at a gradient sending function of the federated learning device by using a pre-deployed aspect framework.

The aspect framework is pre-deployed on the federated learning device. After federated learning starts, the aspect framework can inject the first aspect program at the gradient sending function of the federated learning device based on the first join point and the first aspect program. The gradient sending function is a function used to send a gradient of the federated learning device to a federated learning server. After the gradient sending function is designated as the first join point and the first aspect program is injected, the first aspect program executes predetermined logic when the federated learning device sends a plaintext gradient to the federated learning server by using the gradient sending function, thereby implementing a predetermined service.

In some embodiments, the first join point and the first aspect program can be pre-stored in the federated learning device. After federated learning starts, the aspect framework is started, and join point-based injection can be completed based on the predetermined first join point and the first aspect program. In some other embodiments, the first join point and the first aspect program can be sent by an aspect server. After federated learning starts, the aspect server sends the first join point and the first aspect program to the aspect framework, and the aspect framework completes join point-based injection based on the first join point and the first aspect program that are received.

120: The federated learning device trains a to-be-trained model based on local training data to obtain a plaintext gradient of the to-be-trained model, and sends the plaintext gradient to a federated learning server by using the gradient sending function.

130: Intercept and encrypt, by using the first aspect program, the plaintext gradient sent by using the gradient sending function, to obtain a ciphertext gradient, and send the ciphertext gradient to the federated learning server, so that the federated learning server decrypts received ciphertext gradients sent by federated learning devices, and updates parameters of the to-be-trained model based on the plaintext gradients obtained after the decryption.

When the federated learning device sends the plaintext gradient to the federated learning server by using the gradient sending function, the first aspect program intercepts and encrypts the plaintext gradient, to obtain the ciphertext gradient, and then sends the ciphertext gradient to the federated learning server. After receiving the ciphertext gradient, the federated learning server decrypts the ciphertext gradient to obtain the plaintext gradient again, so as to update the parameters of the to-be-trained model based on the plaintext gradients of the federated learning devices. Since the federated learning device transmits the ciphertext gradient, even if the ciphertext gradient is leaked in an uploading process, an attacker cannot obtain the plaintext gradient based on the ciphertext gradient, and therefore cannot obtain private training data of the federated learning device from the plaintext gradient, thereby implementing more optimal privacy preservation.

According to the federated learning method of this application, the plaintext gradient is encrypted by using the first aspect program injected at the gradient sending function. Therefore, the federated learning method does not need modification of an original federated learning framework, is not intrusive to a federated learning service, and has low maintenance costs.

In some embodiments, before federated learning, an encryption key and a decryption key can be generated first, so as to encrypt the plaintext gradient by using the encryption key to obtain the ciphertext gradient, and decrypt the ciphertext gradient by using the decryption key to obtain the plaintext gradient again. In a federated learning task, the encryption key and the decryption key are globally unique.

In some embodiments, the encryption key and the decryption key can be generated by using a trusted execution environment of the aspect server. After generating the encryption key and the decryption key, the aspect server can send the encryption key to the federated learning device, so as to encrypt the plaintext gradient. Before sending the encryption key to the federated learning device, the federated learning device may first perform authentication to determine whether the trusted execution environment of the aspect server can be trusted. After the authentication succeeds, the federated learning device establishes a trusted transport layer security (TLS) protocol connection to the trusted execution environment of the aspect server, thereby ensuring security of the encryption key in a transmission process.

In some embodiments, the trusted execution environment of the aspect server can be a trusted execution environment that is based on Inter SGX. Inter SGX, which stands for Intel Software Guard Extensions, is a security mechanism designed to provide a hardware-enforced security guarantee that do not rely on firmware or software security states. Inter SGX is actually a group of CPU instruction extensions, and can create a trusted execution environment to protect code and data, which are not accessible even in cases with root permissions. As such, an application program can use Inter SGX to isolate a specific trusted zone for the code and data, thereby ensuring that confidentiality and integrity of the code and data are not compromised by malware. The trusted execution environment provided by the Inter SGX can also be referred to as an enclave, which is used to store code and data that need to be protected.

Before communicating with an SGX-based trusted execution environment, the federated learning device further needs to complete remote authentication on the trusted execution environment. To implement the remote authentication, the aspect server further needs to introduce a special quoting enclave (QE). When the federated learning server performs remote authentication on the trusted execution environment of the aspect server, the trusted execution environment first executes an EREPORT instruction, combines an identity of the trusted execution environment with additional information to generate a report structure, and passes the report structure to the QE. The QE calls EGETKEY to acquire a report key and verifies the report structure, and determines whether the trusted execution environment is run on the same platform. If the remote authentication succeeds, the QE generates an encrypted reference structure QUOTE, signs the encrypted reference structure QUOTE by using an EPID, and then sends QUOTE and the signature to the federated learning device together. Since QUOTE is encrypted and can only be verified by Intel, the federated learning device sends QUOTE to an Inter Attestation Service (IAS). The IAS verifies QUOTE, and returns an authentication report indicating that the trusted execution environment can be trusted. After the federated learning device receives and verifies the authentication report, it indicates that the authentication succeeds, and a trusted TLS connection will be established to the trusted execution environment.

The federated learning server has a gradient receiving function, which is used to receive the gradient of the federated learning device. When the federated learning device sends the ciphertext gradient to the federated learning server, the federated learning server receives the ciphertext gradient by using the gradient receiving function.

Before federated learning starts, the federated learning server injects, based on a predetermined second join point and a second aspect program, the second aspect program at the gradient receiving function of the federated learning server by using the pre-deployed aspect framework. When the federated learning server receives the ciphertext gradient by using the gradient receiving function, the second aspect program intercepts and decrypts the ciphertext gradient, to obtain the corresponding plaintext gradient.

The federated learning server can decrypt the ciphertext gradient by using the decryption key generated by using the trusted execution environment of the aspect server. Similar to the federated learning device, before receiving the decryption key, the federated learning server also needs to perform remote authentication on the trusted execution environment of the aspect server, and then establish a trusted TLS connection after the authentication succeeds.

According to the federated learning method in the embodiments of this application, the plaintext gradient of the federated learning device is encrypted, and the encrypted ciphertext gradient is sent to the federated learning server, thereby reducing privacy leakage caused by acquisition of the plaintext gradient by an attacker. Based on a security aspect, the first aspect program is injected at the gradient sending function of the federated learning device, and the plaintext gradient is intercepted and encrypted by using the first aspect program. The federated learning method does not need modification of the original federated learning framework, is not intrusive to a federated learning service, and has low maintenance costs. The encryption key and the decryption key are generated by using the trusted execution environment of the aspect server, thereby ensuring that the keys are not stolen or forged by an attacker.

Figure 2:
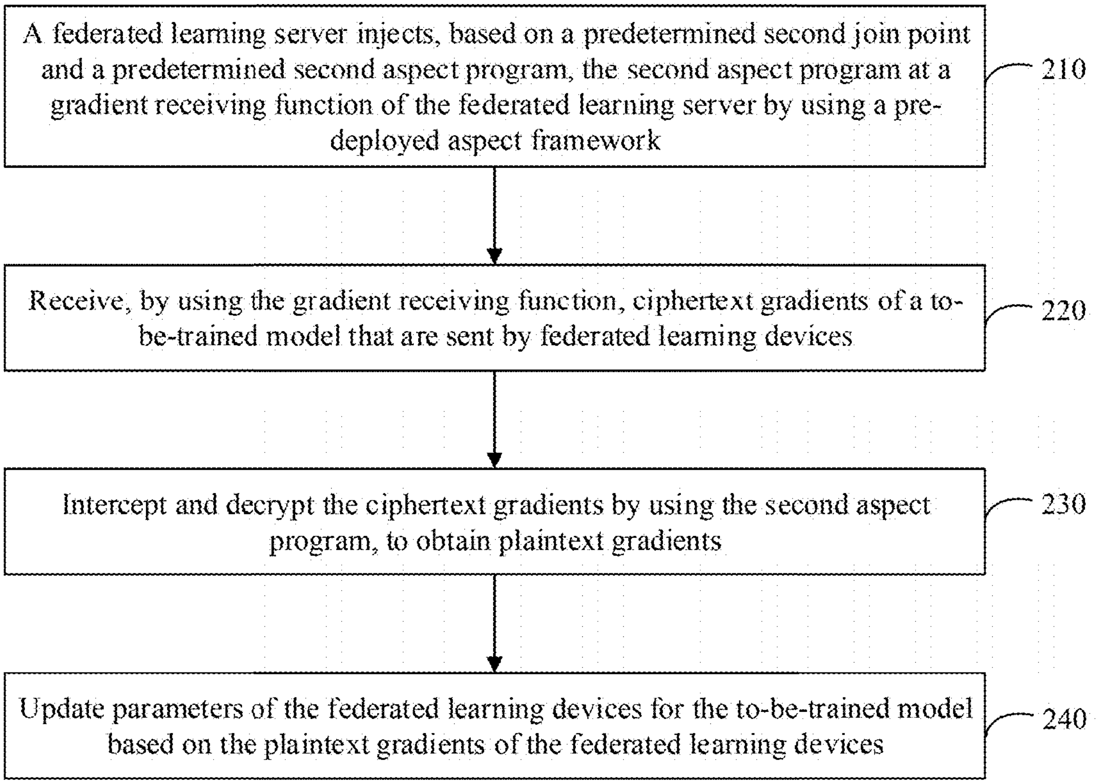
FIG. 2 is a flowchart illustrating a federated learning method, according to some other embodiments of this application.

As shown in FIG. 2, some embodiments of this application provide a federated learning method. The method is applied to a federated learning server and includes steps 210 to 240.

210: The federated learning server injects, based on a predetermined second join point and a second aspect program, the second aspect program at a gradient receiving function of the federated learning server by using a pre-deployed aspect framework.

The aspect framework is pre-deployed on the federated learning server. After federated learning starts, the aspect framework can inject the second aspect program at the gradient receiving function of the federated learning server based on the second join point and the second aspect program. The gradient receiving function is a function used to receive gradients of federated learning devices for a to-be-trained model. When the federated learning devices send gradients to the federated learning server, the federated learning server receives the gradients by using the gradient receiving function. After the gradient receiving function is used as the second join point and the second aspect program is injected, the second aspect program executes predetermined logic when the federated learning server receives ciphertext gradients of the federated learning devices by using the receive gradient function, thereby implementing a predetermined service.

In some embodiments, the second join point and the second aspect program can be pre-stored in the federated learning server. After federated learning starts, the aspect framework is started, and join point-based injection can be completed based on the predetermined second join point and the second aspect program. In some other embodiments, the second join point and the second aspect program can be sent by an aspect server. After federated learning starts, the aspect server sends the second join point and the second aspect program to the aspect framework, and the aspect framework completes join point-based injection based on the second join point and the second aspect program that are received.

220: Receive, by using the gradient receiving function, ciphertext gradients of a to-be-trained model that are sent by federated learning devices.

After federated learning starts, the federated learning devices each inject, based on a predetermined first join point and a first aspect program, the first aspect program at a gradient sending function of the federated learning device by using the pre-deployed aspect framework. Then, the federated learning devices each individually train the to-be-trained model based on local training data, then obtain a plaintext gradient of the to-be-trained model, and send the plaintext gradient to the federated learning server by using the gradient sending function. The first aspect program intercepts and encrypts the plaintext gradient to obtain a ciphertext gradient. Then, the federated learning devices send their respective ciphertext gradients to the federated learning server, and the federated learning server receives the ciphertext gradients of the federated learning devices by using the gradient receiving function.

Since the federated learning server receives the ciphertext gradients, privacy leakage caused by acquisition of the plaintext gradients by an attacker can be reduced.

230: Intercept and decrypt the ciphertext gradients by using the second aspect program, to obtain plaintext gradients.

When the ciphertext gradients are received by using the gradient receiving function, the second aspect program intercepts and decrypts the ciphertext gradients to obtain the corresponding plaintext gradients. Since the second aspect program is injected at the gradient receiving function, the second aspect program does not modify an original federated learning framework, is not intrusive to a federated learning service, and has low maintenance costs.

As there may be multiple federated learning devices, the ciphertext gradient of each federated learning device needs to be intercepted and decrypted by using the second aspect program, so as to obtain the plaintext gradient of each federated learning device.

In some embodiments, before federated learning, an encryption key and a decryption key can be generated first, so that the federated learning device encrypts the plaintext gradient by using the encryption key to obtain the ciphertext gradient, and the federated learning server decrypts the ciphertext gradient by using the decryption key to obtain the plaintext gradient again. In a federated learning task, the encryption key and the decryption key are globally unique.

In some embodiments, the encryption key and the decryption key can be generated by using a trusted execution environment of the aspect server. After generating the encryption key and the decryption key, the aspect server can send the encryption key to each federated learning device, so as to encrypt the plaintext gradient; and send the decryption key to the federated learning server, so as to decrypt the ciphertext gradient. Before sending the encryption key and the decryption key, each federated learning device and the federated learning server can first perform authentication to determine whether the trusted execution environment of the aspect server can be trusted. After the authentication succeeds, the federated learning device and the federated learning server each can establish a trusted transport layer security (TLS) protocol connection to the trusted execution environment of the aspect server, and then the encryption key and the decryption key can be transmitted by using the TLS connection, thereby ensuring security of the encryption key and the decryption key in a transmission process.

In some embodiments, the trusted execution environment of the aspect server can be a trusted execution environment that is based on Inter SGX. Before communicating with the trusted execution environment, the federated learning server further needs to complete remote authentication on the trusted execution environment. A remote authentication process is the same as a remote authentication process of the federated learning device, and details are omitted here for simplicity.

240: Update parameters of the federated learning devices for the to-be-trained model based on the plaintext gradients of the federated learning devices.

After obtaining the plaintext gradients of the federated learning devices, the federated learning server performs gradient aggregation on the plaintext gradients to obtain an aggregated gradient, and then updates parameters of the to-be-trained model of the federated learning devices based on the aggregated gradient.

According to the federated learning method in the embodiments of this application, the federated learning server receives and decrypts the encrypted ciphertext gradients of the federated learning devices, to obtain the decrypted plaintext gradients, thereby reducing privacy leakage caused by acquisition of the plaintext gradients by an attacker in a transmission process. Based on a security aspect, the second aspect program is injected at the gradient receiving function of the federated learning server, and the ciphertext gradients are intercepted and decrypted by using the second aspect program. The federated learning method does not need modification of the original federated learning framework, is not intrusive to a federated learning service, and has low maintenance costs. The encryption key and the decryption key are generated by using the trusted execution environment of the aspect server, thereby ensuring that the keys are not stolen or forged by an attacker.

Figure 3:
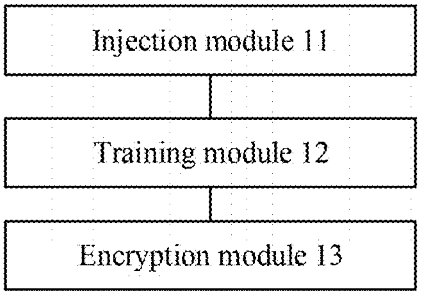
FIG. 3 is a structural block diagram illustrating a federated learning apparatus, according to still some other embodiments of this application.

As shown in FIG. 3, still some other embodiments of this application provide a federated learning apparatus. The apparatus is applied to a federated learning device, and includes an injection module 11, a training module 12, and an encryption module 13 that can perform mutual data communication.

The injection module 11 is configured to inject, based on a predetermined first join point and a first aspect program, the first aspect program at a gradient sending function of the federated learning device by using a pre-deployed aspect framework.

The aspect framework is pre-deployed on the federated learning device. After federated learning starts, the injection module 11 can inject, based on the first join point and the first aspect program, the first aspect program at the gradient sending function of the federated learning device by using the aspect framework. The gradient sending function is a function used to send a gradient of the federated learning device to a federated learning server. After the gradient sending function is designated as the first join point and the first aspect program is injected, the first aspect program executes predetermined logic when the federated learning device sends a plaintext gradient to the federated learning server by using the gradient sending function, thereby implementing a predetermined service.

In some embodiments, the first join point and the first aspect program can be pre-stored in the federated learning device. After federated learning starts, the aspect framework is started, and join point-based injection can be completed based on the predetermined first join point and the first aspect program. In some other embodiments, the first join point and the first aspect program can be sent by an aspect server. After federated learning starts, the aspect server sends the first join point and the first aspect program to the aspect framework, and the injection module 11 completes join point-based injection by using the aspect framework.

The training module 12 is configured to train a to-be-trained model based on local training data to obtain a plaintext gradient of the to-be-trained model, and send the plaintext gradient to the federated learning server by using the gradient sending function.

The encryption module 13 is configured to intercept and encrypt, by using the first aspect program, the plaintext gradient sent by using the gradient sending function, to obtain a ciphertext gradient, and send the ciphertext gradient to the federated learning server, so that the federated learning server decrypts received ciphertext gradients sent by federated learning devices, and updates parameters of the to-be-trained model based on the plaintext gradients obtained after the decryption.

When the injection module 11 sends the plaintext gradient to the federated learning server by using the gradient sending function, the encryption module 13 intercepts and encrypts the plaintext gradient by using the first aspect program, to obtain the ciphertext gradient, and then sends the ciphertext gradient to the federated learning server. After receiving the ciphertext gradient, the federated learning server decrypts the ciphertext gradient to obtain the plaintext gradient again, so as to update the parameters of the to-be-trained model based on the plaintext gradients of the federated learning devices. Since the ciphertext gradient is transmitted, even if the ciphertext gradient is leaked in an uploading process, an attacker cannot obtain the plaintext gradient based on the ciphertext gradient, and therefore cannot obtain private training data of the federated learning device from the plaintext gradient, thereby implementing more optimal privacy preservation.

The encryption module 13 encrypts the plaintext gradient by using the first aspect program injected at the gradient sending function. Therefore, the federated learning apparatus does not need modification of an original federated learning framework, is not intrusive to a federated learning service, and has low maintenance costs.

In some embodiments, before federated learning, an encryption key and a decryption key can be generated first, so as to encrypt the plaintext gradient by using the encryption key to obtain the ciphertext gradient, and decrypt the ciphertext gradient by using the decryption key to obtain the plaintext gradient again. In a federated learning task, the encryption key and the decryption key are globally unique.

In some embodiments, the encryption key and the decryption key can be generated by using a trusted execution environment of the aspect server. After generating the encryption key and the decryption key, the aspect server can send the encryption key to the federated learning device, so as to encrypt the plaintext gradient. Before sending the encryption key to the federated learning device, the federated learning device may first perform authentication to determine whether the trusted execution environment of the aspect server can be trusted. After the authentication succeeds, the federated learning device establishes a trusted transport layer security (TLS) protocol connection to the trusted execution environment of the aspect server, thereby ensuring security of the encryption key in a transmission process. Therefore, the federated learning apparatus can further include a connection module. The connection module is configured to perform remote authentication on a trusted execution environment of the aspect server before federated learning, and establish a trusted TLS connection to the trusted execution environment after the authentication succeeds; and receive the encryption key generated by using the trusted execution environment.

In some embodiments, the trusted execution environment of the aspect server can be a trusted execution environment that is based on Inter SGX.

The federated learning server has a gradient receiving function, which is used to receive the gradient of the federated learning device. When the encryption module 13 sends the ciphertext gradient to the federated learning server, the federated learning server receives the ciphertext gradient by using the gradient receiving function.

Before federated learning starts, the federated learning server injects, based on a predetermined second join point and a second aspect program, the second aspect program at the gradient receiving function of the federated learning server by using the pre-deployed aspect framework. When the federated learning server receives the ciphertext gradient by using the gradient receiving function, the second aspect program intercepts and decrypts the ciphertext gradient, to obtain the corresponding plaintext gradient.

The federated learning server can decrypt the ciphertext gradient by using the decryption key generated by using the trusted execution environment of the aspect server. Same as the federated learning device, before receiving the decryption key, the federated learning server needs to perform remote authentication on the trusted execution environment of the aspect server, and then establish a trusted TLS connection after the authentication succeeds.

According to the federated learning apparatus in the embodiments of this application, the plaintext gradient is encrypted by using the encryption module 13, and the encrypted ciphertext gradient is sent to the federated learning server, thereby reducing privacy leakage caused by acquisition of the plaintext gradient by an attacker. Based on a security aspect, the first aspect program is injected at the gradient sending function by using the injection module 11, and the plaintext gradient is intercepted and encrypted by using the first aspect program. The federated learning apparatus does not need modification of the original federated learning framework, is not intrusive to a federated learning service, and has low maintenance costs. The encryption key and the decryption key are generated by using the trusted execution environment of the aspect server, thereby ensuring that the keys are not stolen or forged by an attacker.

Figure 4:
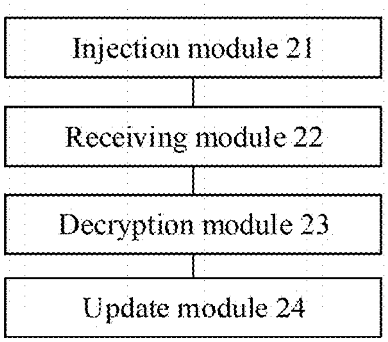
FIG. 4 is a structural block diagram illustrating a federated learning apparatus, according to still some other embodiments of this application.

As shown in FIG. 4, still some other embodiments of this application provide a federated learning apparatus. The apparatus is applied to a federated learning server, and includes an injection module 21, a receiving module 22, a decryption module 23, and an update module 24 that can perform mutual data communication.

The injection module 21 is configured to inject, based on a predetermined second join point and a second aspect program, the second aspect program at a gradient receiving function of the federated learning server by using a pre-deployed aspect framework.

The aspect framework is pre-deployed on the federated learning server. After federated learning starts, the injection module 21 can inject, based on the second join point and the second aspect program, the second aspect program at the gradient receiving function of the federated learning server by using the aspect framework. The gradient receiving function is a function used to receive gradients of federated learning devices for a to-be-trained model. When the federated learning devices send gradients to the federated learning server, the federated learning server receives the gradients by using the gradient receiving function. After the gradient receiving function is used as the second join point and the second aspect program is injected, the second aspect program executes predetermined logic when the federated learning server receives ciphertext gradients of the federated learning devices by using the receive gradient function, thereby implementing a predetermined service.

In some embodiments, the second join point and the second aspect program can be pre-stored in the federated learning server. After federated learning starts, the aspect framework is started, and the injection module 21 completes join point-based injection based on the predetermined second join point and the second aspect program. In some other embodiments, the second join point and the second aspect program can be sent by an aspect server. After federated learning starts, the aspect server sends the second join point and the second aspect program to the aspect framework, and the injection module 21 completes join point-based injection by using the aspect framework.

The receiving module 22 is configured to receive, by using the gradient receiving function, ciphertext gradients of a to-be-trained model that are sent by federated learning devices.

After federated learning starts, the federated learning devices each inject, based on a predetermined first join point and a first aspect program, the first aspect program at a gradient sending function of the federated learning device by using the pre-deployed aspect framework. Then, the federated learning devices each individually train the to-be-trained model based on local training data, then obtain a plaintext gradient of the to-be-trained model, and send the plaintext gradient to the federated learning server by using the gradient sending function. The first aspect program intercepts and encrypts the plaintext gradient to obtain a ciphertext gradient. Then, the federated learning devices send their respective ciphertext gradients to the federated learning server, and the receiving module 22 receives the ciphertext gradients of the federated learning devices by using the gradient receiving function.

Since the receiving module 22 receives the ciphertext gradients, privacy leakage caused by acquisition of the plaintext gradients by an attacker can be reduced.

The decryption module 23 is configured to intercept and decrypt the ciphertext gradients by using the second aspect program, to obtain plaintext gradients.

When the ciphertext gradients are received by using the gradient receiving function, the decryption module 23 intercepts and decrypts the ciphertext gradients by using the second aspect program to obtain the corresponding plaintext gradients. Since the second aspect program is injected at the gradient receiving function, the second aspect program does not modify an original federated learning framework, is not intrusive to a federated learning service, and has low maintenance costs.

As there may be multiple federated learning devices, the ciphertext gradient of each federated learning device needs to be intercepted and decrypted by using the second aspect program, so as to obtain the plaintext gradient of each federated learning device.

In some embodiments, before federated learning, an encryption key and a decryption key can be generated first, so that the federated learning device encrypts the plaintext gradient by using the encryption key to obtain the ciphertext gradient, and the federated learning server decrypts the ciphertext gradient by using the decryption key to obtain the plaintext gradient again. In a federated learning task, the encryption key and the decryption key are globally unique.

In some embodiments, the encryption key and the decryption key can be generated by using a trusted execution environment of the aspect server. After generating the encryption key and the decryption key, the aspect server can send the encryption key to each federated learning device, so as to encrypt the plaintext gradient; and send the decryption key to the federated learning server, so as to decrypt the ciphertext gradient. Before sending the encryption key and the decryption key, each federated learning device and the federated learning server can first perform authentication to determine whether the trusted execution environment of the aspect server can be trusted. After the authentication succeeds, the federated learning device and the federated learning server each can establish a trusted transport layer security (TLS) protocol connection to the trusted execution environment of the aspect server, and then the encryption key and the decryption key can be transmitted by using the TLS connection, thereby ensuring security of the encryption key and the decryption key in a transmission process. Therefore, the federated learning apparatus can further include a connection module. The connection module is configured to perform remote authentication on a trusted execution environment of the aspect server before federated learning, and establish a trusted TLS connection to the trusted execution environment after the authentication succeeds; and receive the decryption key generated by using the trusted execution environment.

In some embodiments, the trusted execution environment of the aspect server can be a trusted execution environment that is based on Inter SGX. Before communicating with the trusted execution environment, the federated learning server further needs to complete remote authentication on the trusted execution environment. A remote authentication process is the same as a remote authentication process of the federated learning device, and details are omitted here for simplicity.

The update module 24 is configured to update parameters of the federated learning devices for the to-be-trained model based on the plaintext gradients of the federated learning devices.

After obtaining the plaintext gradients of the federated learning devices, the update module 24 performs gradient aggregation on the plaintext gradients to obtain an aggregated gradient, and then update parameters of the to-be-trained model of the federated learning devices based on the aggregated gradient.

According to the federated learning apparatus in the embodiments of this application, the receiving module 22 receives and decrypts the encrypted ciphertext gradients of the federated learning devices, to obtain the decrypted plaintext gradients, thereby reducing privacy leakage caused by acquisition of the plaintext gradients by an attacker in a transmission process. Based on a security aspect, the injection module 21 injects the second aspect program at the gradient receiving function of the federated learning server, and the decryption module 23 intercepts and decrypts the ciphertext gradients by using the second aspect program. The federated learning apparatus does not need modification of the original federated learning framework, is not intrusive to a federated learning service, and has low maintenance costs. The encryption key and the decryption key are generated by using the trusted execution environment of the aspect server, thereby ensuring that the keys are not stolen or forged by an attacker.

Still some other embodiments of this application provide a readable storage medium. A computer program is stored on the readable storage medium, and when the computer program is executed in a computer, the computer is enabled to perform the steps of the federated learning method in the above-mentioned embodiments of this application.

Still some other embodiments of this application provide an electronic device, including a storage and a processor. The storage stores executable code, and when executing the executable code, the processor performs the steps of the federated learning method in the above-mentioned embodiments of this application.

The systems, apparatuses, modules, or units described in the above-mentioned embodiments can be specifically implemented by a computer chip or an entity, or can be implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the above-mentioned apparatus is described by dividing functions into various units. Certainly, when this application is implemented, a function of each unit can be implemented in one or more pieces of software and/or hardware.

A person skilled in the art should understand that the embodiments of this application can be provided as methods, systems, or computer program products. Therefore, this application can use a form of hardware only embodiments, software only embodiments, or embodiments with a combination of software and hardware. In addition, a form of a computer program product that is implemented on one or more computer-usable storage media (including but not limited to a disk storage, a CD-ROM, an optical storage, etc.) that include computer-usable program code can be used in this application.

This application is described with reference to the flowcharts and/or block diagrams of the methods, the devices (systems), and the computer program products according to the embodiments of this application. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions can also be stored in a computer-readable storage that can instruct a computer or another programmable data processing device to work in a specific manner, so that an instructions stored in the computer-readable storage generate an artifact including an instruction apparatus, and the instruction apparatus implements a function specified in one or more procedures of a flowchart and/or one or more blocks of a block diagram.

The computer program instructions can alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

In a typical configuration, a computing device includes one or more central processing units (CPUs), input/output interfaces, network interfaces, and memories.

The memory may include a non-persistent storage, a random access memory (RAM), and/or a nonvolatile memory in a computer-readable medium, for example, a read-only memory (ROM) or a flash read-only memory (flash RAM). The memory is an example of the computer-readable medium.

The computer-readable medium includes permanent and non-permanent, removable and non-removable media, and can store information by using any method or technology. The information can be computer-readable instructions, data structures, program modules, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a cassette magnetic disk storage, or another magnetic storage device, or any other non-transmission medium. The computer storage medium can be configured to store information accessible by a computing device. Based on the definition in this specification, the computer-readable medium does not include transitory media such as a modulated data signal and carrier.

It is worthwhile to further note that the terms “include”, “comprise”, or any other variant thereof are intended to cover a non-exclusive inclusion, so that a process, a method, a product, or a device that includes a list of elements not only includes those elements but also includes other elements which are not expressly listed, or further includes elements inherent to such a process, method, product, or device. Without more constraints, an element preceded by “includes a . . . ” does not preclude the existence of additional identical elements in the process, method, product, or device that includes the element.

A person skilled in the art should understand that the embodiments of this specification can be provided as methods, systems, or computer program products. Therefore, this specification can use a form of hardware only embodiments, software only embodiments, or embodiments with a combination of software and hardware. In addition, a form of a computer program product that is implemented on one or more computer-usable storage media (including but not limited to a disk storage, a CD-ROM, an optical storage, etc.) that include computer-usable program code can be used in this application.

This specification can be described in the general context of computer-executable instructions, for example, a program module. Generally, the program module includes a routine, a program, an object, a component, a data structure, etc. executing a specific task or implementing a specific abstract data type. This specification can alternatively be practiced in distributed computing environments. In the distributed computing environments, tasks are executed by remote processing devices connected through a communication network. In the distributed computing environments, the program module can be located in both local and remote computer storage media including storage devices.

The embodiments in this specification are described in a progressive way. For same or similar parts of the embodiments, mutual references can be made to the embodiments. Each embodiment focuses on a difference from other embodiments. Particularly, the system embodiments are basically similar to the method embodiments, and therefore are described briefly. For related parts, references can be made to some descriptions of the method embodiments.

The descriptions above are merely example embodiments of this application, and are not intended to limit the scope of this application. Various changes can be further made to the above-mentioned embodiments of this application. That is, all simple equivalent changes and modifications made according to the claims and the contents of this specification of this application fall within the protection scope of the claims of this application. All contents not described in detail in this application are conventional technical contents.

What is claimed is:

1. A method for federated learning, comprising:

injecting, by a federated learning device based on a predetermined first join point and a first aspect program, the first aspect program at a gradient sending function of the federated learning device by using a pre-deployed aspect framework;

training, by the federated learning device, a to-be-trained model based on local training data to obtain a plaintext gradient of the to-be-trained model, and sending the plaintext gradient to a federated learning server by using the gradient sending function;

intercepting and encrypting, by using the first aspect program, the plaintext gradient sent by using the gradient sending function to obtain a ciphertext gradient; and sending the ciphertext gradient to the federated learning server, wherein a plaintext decrypted from the ciphertext gradient is used for updating parameters of the to-be-trained model.

2. The method according to claim 1, further comprising:

performing, by the federated learning device, remote authentication on a trusted execution environment of an aspect server before federated learning;

establishing a trusted transport layer security protocol connection to the trusted execution environment after the remote authentication succeeds; and receiving an encryption key generated by using the trusted execution environment.

3. The method according to claim 1, further comprising:
decrypting, by the federated learning server, the ciphertext gradient sent by the federated learning device to obtain the plaintext gradient; and
updating the parameters of the to-be-trained model based on the plaintext gradient obtained after the decryption.

4. The method according to claim 1, further comprising:
receiving, by the federated learning server, the ciphertext gradient by using a gradient receiving function; and
intercepting and decrypting, by the federated learning server, the ciphertext gradient by using a second aspect program pre-injected at the gradient receiving function.

5. A method for federated learning, comprising:
injecting, by a federated learning server based on a predetermined second join point and a second aspect program, the second aspect program at a gradient receiving function of the federated learning server by using a pre-deployed aspect framework;
receiving, by using the gradient receiving function, ciphertext gradients of a to-be-trained model that are sent by federated learning devices;
intercepting and decrypting the ciphertext gradients by using the second aspect program to obtain plaintext gradients; and
updating parameters of the to-be-trained model for the federated learning devices based on the plaintext gradients of the federated learning devices.

6. The method according to claim 5, further comprising:
performing remote authentication on a trusted execution environment of an aspect server before federated learning;
establishing a trusted transport layer security protocol connection to the trusted execution environment after the remote authentication succeeds; and
receiving a decryption key generated by using the trusted execution environment.

7. A system, comprising:
one or more first processors of a federated learning device; and
one or more first tangible, non-transitory, machine-readable media storing one or more first instructions that, when executed by the one or more first processors, perform first operations comprising:
injecting, by the federated learning device based on a predetermined first join point and a first aspect program, the first aspect program at a gradient sending function of the federated learning device by using a pre-deployed aspect framework;
training, by the federated learning device, a to-be-trained model based on local training data to obtain a plaintext gradient of the to-be-trained model, and sending the plaintext gradient to a federated learning server by using the gradient sending function;
intercepting and encrypting, by using the first aspect program, the plaintext gradient sent by using the gradient sending function to obtain a ciphertext gradient; and
sending the ciphertext gradient to the federated learning server, wherein a plaintext decrypted from the ciphertext gradient is used for updating parameters of the to-be-trained model.

8. The system according to claim 7, wherein the first operations further comprise:
performing, by the federated learning device, remote authentication on a trusted execution environment of an aspect server before federated learning;
establishing a trusted transport layer security protocol connection to the trusted execution environment after the remote authentication succeeds; and
receiving an encryption key generated by using the trusted execution environment.

9. The system according to claim 7, further comprising:
one or more second processors of the federated learning server; and
one or more second tangible, non-transitory, machine-readable media storing one or more second instructions that, when executed by the one or more second processors, perform second operations comprising:
decrypting, by the federated learning server, the ciphertext gradient sent by the federated learning device to obtain the plaintext gradient; and
updating the parameters of the to-be-trained model based on the plaintext gradient obtained after the decryption.

10. The system according to claim 7, further comprising:
one or more second processors of the federated learning server; and
one or more second tangible, non-transitory, machine-readable media storing one or more second instructions that, when executed by the one or more second processors, perform second operations comprising:
receiving, by the federated learning server, the ciphertext gradient by using a gradient receiving function; and
intercepting and decrypting, by the federated learning server, the ciphertext gradient by using a second aspect program pre-injected at the gradient receiving function.

11. The system according to claim 7, further comprising:
one or more second processors of the federated learning server; and
one or more second tangible, non-transitory, machine-readable media storing one or more second instructions that, when executed by the one or more second processors, perform second operations comprising:
injecting, by the federated learning server based on a predetermined second join point and a second aspect program, the second aspect program at a gradient receiving function of the federated learning server by using the pre-deployed aspect framework;
receiving, by using the gradient receiving function, ciphertext gradients of the to-be-trained model that are sent by federated learning devices;
intercepting and decrypting the ciphertext gradients by using the second aspect program to obtain plaintext gradients; and
updating the parameters of the to-be-trained model for the federated learning devices based on the plaintext gradients of the federated learning devices.

12. The system according to claim 11, wherein the second operations further comprise:
performing remote authentication on a trusted execution environment of an aspect server before federated learning;
establishing a trusted transport layer security protocol connection to the trusted execution environment after the remote authentication succeeds; and
receiving a decryption key generated by using the trusted execution environment.

* * * * *